(12) United States Patent
Tyler et al.

(10) Patent No.: US 10,437,712 B1
(45) Date of Patent: Oct. 8, 2019

(54) API FUNCTIONAL-TEST GENERATION

(71) Applicant: CA, Inc., Islandia, NY (US)

(72) Inventors: Stephen Tyler, Islandia, NY (US);
Vijay Senapathi, Islandia, NY (US);
Apoorva Choudhary, Islandia, NY (US); Wendell Beckwith, Islandia, NY (US); Naresh Pillarikuppam, Islandia, NY (US)

(73) Assignee: CA, INC., Istandia, NY (US)

( * ) Notice: Subject to any disclaimer, the term of this patent is extended or adjusted under 35 U.S.C. 154(b) by 0 days.

(21) Appl. No.: 16/013,488

(22) Filed: Jun. 20, 2018

(51) Int. Cl.
*G06F 8/36* (2018.01)
*G06F 11/26* (2006.01)
*G06F 11/36* (2006.01)
*G06F 17/27* (2006.01)

(52) U.S. Cl.
CPC .................. *G06F 11/3684* (2013.01)

(58) Field of Classification Search
CPC .................................... G06F 11/3684
See application file for complete search history.

(56) References Cited

U.S. PATENT DOCUMENTS

| | | | |
|---|---|---|---|
| 8,001,532 B1 | 8/2011 | Jakubiak et al. | |
| 8,065,662 B1 * | 11/2011 | Trounine | G06F 11/3684 713/182 |
| 9,959,198 B1 * | 5/2018 | Jha | G06F 11/3664 |
| 2010/0274519 A1 | 10/2010 | Marcinno' | |
| 2014/0188929 A1 | 7/2014 | Hanamoto et al. | |
| 2015/0288702 A1 | 10/2015 | Choe et al. | |
| 2016/0283364 A1 * | 9/2016 | Raghavan | G06F 11/3692 |
| 2016/0335454 A1 | 11/2016 | Choe et al. | |
| 2018/0167217 A1 | 6/2018 | Brady et al. | |
| 2018/0357154 A1 * | 12/2018 | Dolby | G06F 11/3684 |

OTHER PUBLICATIONS

Automated API Testing and You: A Step-by-Step Tutorial, Sep. 14, 2017, QASymphony (Year: 2017).*
Dietz, N., et al., "Swagger Test Templates: Test Your APIs," Apigee, Retrieved from the Internet: URL: <https://apigee.com/about/blog/api-technology/swagger-test-templates-test-your-apis>, [retrieved on Oct. 13, 2017], Jul. 2015, 6 pages.
"OpenAPI Specification," Wikipedia, May 2018, Retrieved from the Internet: URL: <https://en.wikipedia.org/wiki/OpenAPI_Specification>, 4 pages.

(Continued)

*Primary Examiner* — Chat C Do
*Assistant Examiner* — Noor Alkhateeb
(74) *Attorney, Agent, or Firm* — Pillsbury Winthrop Shaw Pittman LLP

(57) ABSTRACT

Provided is a process, including: obtaining a model of an application program interface ("API"); receiving a request to generate a functional-test specification for the API; detecting sets of functionality identified by the model of the API and respective sets of parameters corresponding to the detected sets of functionality by parsing the model of the API; in response to receiving the request, generating the functional-test specification for the API by, for at least some respective detected sets of functionality, specifying respective sets of functional tests based on corresponding sets of parameters.

20 Claims, 4 Drawing Sheets

(56) References Cited

OTHER PUBLICATIONS

"OpenAPI Specification, Version 3.0.1," OpenAPI Specification | Swagger, 2018, Retrieved from the Internet: URL: <https://swagger.io/specification/#oasDocument>, 135 pages.

"List of HTTP status codes," Wikipedia, May 2018, Retrieved from the Internet: URL: https://en.wikipedia.org/wiki/List_of_HTTP_status_codes>, 14 pages.

* cited by examiner

API FUNCTIONAL-TEST GENERATION

CROSS-REFERENCE TO RELATED APPLICATIONS

No cross-reference is presented at this time.

BACKGROUND

1. Field

The present disclosure relates generally to testing and, more specification, to application program interface (API) functional-test generation.

2. Description of the Related Art

Application program interfaces (APIs) often include a set of defined approaches for communication between software components, such as a protocol. Generally, an API is often presented at a separation of concern between software components, to make management of the distinct software components tractable, particularly for large bodies of code or code that is intended to be extensible by a diverse set of third parties. Often, an API shields consumers of the API (e.g., those submitting API requests or otherwise invoking functionality exposed via the API) from implementation-level complexity of the code by which the API is implemented. APIs often define sets of approaches by which functionality of libraries, frameworks, operating systems, remote services, and web services (among other examples) are invoked by API consumers with API requests, such as API commands.

SUMMARY

The following is a non-exhaustive listing of some aspects of the present techniques. These and other aspects are described in the following disclosure.

Some aspects include a process, including: obtaining, with one or more processors, a model of an application program interface ("API"), wherein: the model of the API describes how to interact with the API, the model of the API comprises a first identifier of a first set of functionality exposed by the API, the model of the API associates with the first identifier a first set of a plurality parameters of at least some functions of the first set of functionality and by which at least some functionality of the first set of functionality is invoked in API requests, at least in part, by specifying values of respective parameters in API requests, and the model of the API is distinct from source code of one or more processes implementing functionality of the API; receiving, with one or more processors, a request to generate a functional-test specification for the API, the functional-test specification specifying a plurality of tests of functionality of the API with test cases specified by the functional-test specification; detecting, with one or more processors, sets of functionality identified by the model of the API and respective sets of parameters corresponding to the detected sets of functionality by parsing the model of the API; in response to receiving the request, generating, with one or more processors, the functional-test specification for the API by, for at least some respective detected sets of functionality, specifying respective sets of functional tests based on corresponding sets of parameters, wherein: specifying respective sets of tests comprises specifying a first set of tests of the first set of functionality, the first set of tests comprises respective positive test cases that test different respective subsets of parameters among the first set of the plurality of parameters, the positive test cases have values of respective parameters in different respective subsets of parameters that correctly invoke functionality of the API in the first set of functionality, the first set of tests comprises respective negative test cases that test different respective subsets of parameters among the first set of the plurality of parameters, the negative test cases have values of respective parameters in different respective subsets of parameters that incorrectly invoke functionality of the API in the first set of functionality, and specifications of tests among the first set of tests comprise respective criteria by which API responses to respective tests are determined to pass or fail respective tests; and storing, with one or more processors, the functional-test specification in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
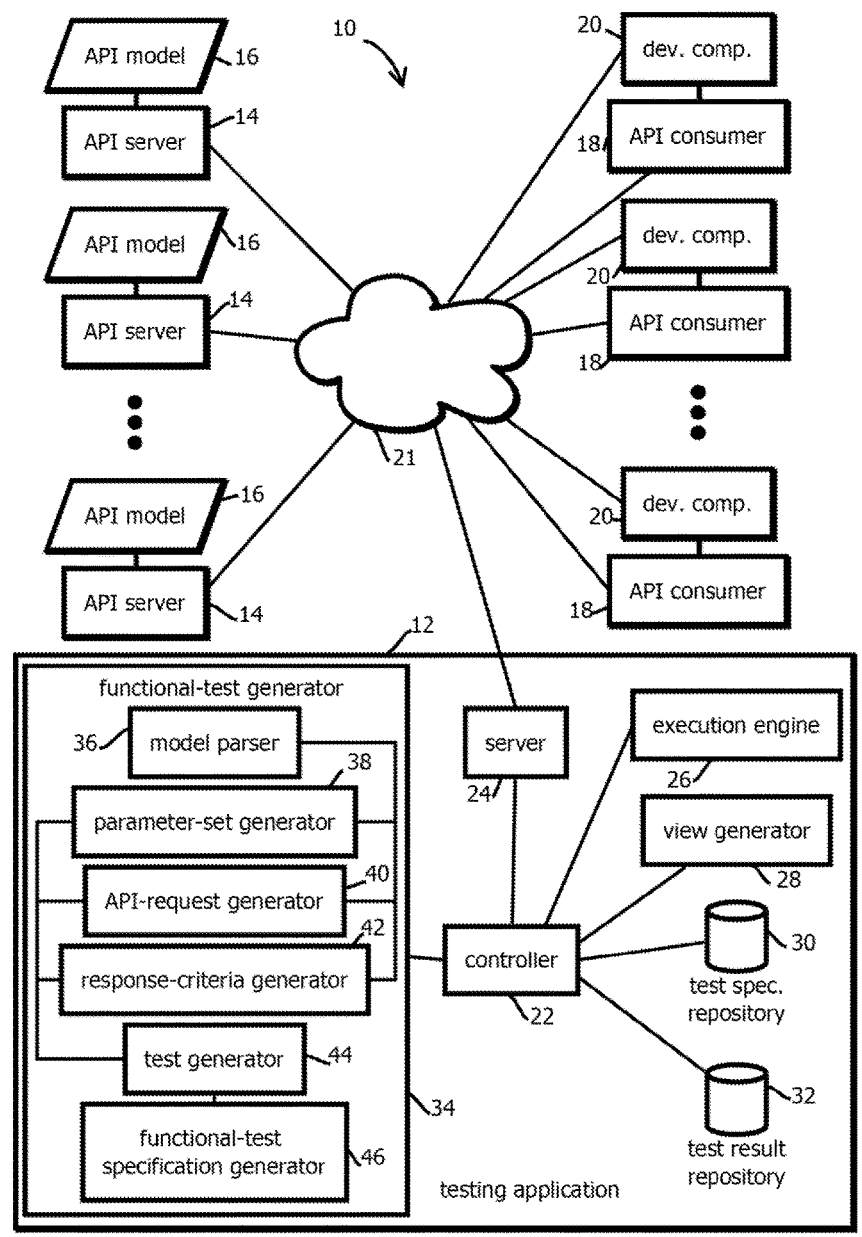
FIG. 1 is a physical and logical architecture block diagram showing a testing application in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of software development tooling and software testing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Functional testing of APIs is often lacking in many development processes. In part, this is due to the scale and complexity of the task. In many cases, APIs expose a diverse set of functions, often with many parameters for each of the functions, and it can be challenging to comprehensively compose functional tests for each function, for each parameter, for each way in which the parameter can cause the API to engage in a particular class of behavior, like responding correctly, throwing an error, providing/blocking elevated levels of access to a threat actor, or the like. These challenges are compounded by the trend towards increased versioning of APIs, as each version of an API may warrant at least partially different sets of functional tests, and increased proliferation of APIs between different services in distributed applications.

Generally, extant functional test related tooling cannot generate test cases automatically to validate the application under test. Currently developers and testers manually write only handful of test cases to test their system. Lack of time and knowledge also hinder the process. As a result, the application is not fully validated against its expected behavior and defects escape beyond development. This is due, in part, to the absence of techniques to generate appropriate and comprehensive sets of functional tests. The challenge involves more than mere automation of manual tasks, as computers are not capable of the types of cognition applied by developers when composing functional tests. The thought process a developer applies does not have a readily identifiable analog by which the manual process can be automated.

Recent trends in API documentation, however, afford information that some embodiments leverage to automatically generate tests in a way that is distinct from traditional manual approaches. Some embodiments algorithmically create a comprehensive set of test cases based on an API model, such as a Swagger specification. Some embodiments analyze various aspects of the API's expected behavior, as inferred or otherwise extracted from a corresponding API model, and create test cases to exercise each (e.g., each of at least some, or each and every) aspect of the API's expected behavior. To this end, some embodiments also create negative test cases to further validate that the APIs are behaving as expected.

Some embodiments are expected to addresses both lack of time and know-how by API developers and consumers by automatically and scientifically generating a set of test cases to comprehensively test the API. The test cases may include positive, negative, edge positive, edge negative and other test design pattern based scenarios. It should be emphasized, though, that embodiments are not limited to systems that afford these benefits, as several independently useful techniques are described and subsets of those techniques may be used to other ends, none of which is to suggest that any other description is limiting.

FIG. 1 depicts a computing environment 10 with a testing application 12 configured to generate functional-test specifications to test a plurality of APIs hosted by API servers 14 and described by a respective corresponding API models 16. In some embodiments, these functional-test specifications may be generated on behalf of API consumer processes 18 under the control of corresponding developer computing devices 20 of developers of those API consumer processes 18. In some embodiments, these various components may communicate via the Internet 21, a private network, or combinations thereof. In some embodiments, the testing application 12 is configured to execute a process described below with reference to FIG. 2 to generate a functional-test specification based upon an application program interface model. In some embodiments, the testing application 12 is further configured to test an API with tests specified by a functional-test specification with the process described below with reference to FIG. 3. In some embodiments, the various components and processes described herein may be executed on computing devices like the computing device described below with reference to FIG. 4, for instance, on a single computing device, on a cluster of networked computing devices, in a data center providing a public cloud implementation, on-premises, in a data center providing a private cloud implementation, or in a hybrid public-private cloud (or on/off premises) model across public and private data centers.

It should be emphasized that functional testing of an API, in some implementations, is distinct from functional testing via manipulation of a graphical user interface (e.g., simulating clicks in the GUI to invoke functionality). Often, graphical user interfaces provide an intermediate layer between the user and an API and can be used to cause API requests to be generated. But functional testing by specifying graphical user interface inputs is often relatively brittle compared to functional testing of an API, as automated scripting of graphical user interface inputs can break relatively easy, for instance, due to changes in the presentation of the graphical user interface independent of changes in the API. Further, many APIs do not have a corresponding graphical user interface, and many functions of APIs do not have corresponding graphical user interface inputs by which those functions can be invoked. None of this is to suggest, though, that testing via a GUI is disclaimed or that any other subject matter is disclaimed.

Some embodiments of the present techniques can generate functional tests of an API without having access to the source code of processes by which the APIs implemented. Some embodiments generate functional tests based upon API-consumer-facing documentation that is distinct from source code of the API, and some embodiments generate these functional tests without having access to the source code of the processes by which the APIs implemented. In some embodiments, APIs are hosted by different parties from API consumers, and those different entities may be unwilling to share source code to support test generation.

Functional tests test what the API under test does in response to input test cases that exercise functionality of the API, e.g., promised functionality in API documentation or expected functionality of a consumer of the API. In many cases, a relatively large number of functional tests each test a different portion of the functionality of the API. Functional tests test whether an API functions in accordance with documentation purporting to describe functionality of the API. Functional testing is distinct from performance testing (which generally tests how functions perform under relatively large loads), and functional testing is distinct from unit testing (which generally tests modules of source code with tests integrated with that source code). Functional testing can include some types of security testing that turn on functional behavior of the API under test, examples of which are described below.

Various types of APIs, including the examples described above, may be tested with tests specified by implementations of the present techniques. In some embodiments, the API is a representational state transfer (REST) API. In some embodiments, resources or collections of resources may be operated upon with a predefined set of stateless operations, for instance, by composing API requests that specify one of the stateless operations and an API endpoint, for instance, expressed as a uniform resource locator that specifies the web resources or collection thereof. In some embodiments, the API may be designed around a client-server architecture in which clients send API requests to the server exposing the API; the server causes program code that services the request to be executed; and the server returns results to the client. In some embodiments, syntax, parameter fields, and reserved terms for requests to the API may be specified by an API schema, and responses from the API may be structure in accordance with the API schema. In some cases, the API schema may be expressed explicitly or implicitly in an API model provided to consumers of the API.

In some embodiments, API requests may be expressed in application-layer protocols (for instance corresponding to the application layer of the Open Systems Interconnection (OSI) model). In some cases, the application layer protocol is hypertext transport protocol (HTTP), a term which is used herein to refer to both HTTP and HTTP secure. Other examples of application-layer protocols in which API request may be expressed include interplanetary file system (IPFS), lightweight directory access protocol (LDAP), multipurpose internet mail extensions (MIME), post office protocol (POP), remote desktop protocol (RDP), remote procedure call (RPC), simple mail transfer protocol (SMTP), secure shell (SSH), and the like. In some embodiments, an API model may identify an application-layer protocol through which the API is accessible, and embodiments may generate API requests in functional tests in accordance with this protocol, in some cases including a prefix corresponding to the protocol, like a prefix of "H-T;T-P-S://." (Note that dashes are inserted to comply with USPTO rules prohibiting the inclusion of validly formatted links, so the dashes should re read as being omitted. A similar approach is used below to replace "<" and ">" with "[" and "]".)

In some embodiments, the application-layer protocol may specify a set of methods, which may also be referred to as verbs, that may be paired with API endpoints in API commands to invoke different functionality corresponding to the endpoint, depending upon which method of the application-layer protocol is paired with the API endpoint in an API request. Examples of such methods include those in HTTP, like GET, PUT, PATCH, POST, and DELETE. For example, one API command may request a GET operation of a given API endpoint (for instance a request to return resources at a given URL), while a different API request may request a POST operation of the given API endpoint (for instance, a request to store specified resources in association with the given URL provided via API request parameters). In some cases, each unique pair of an application-layer protocol method and an API endpoint corresponds to a function of the API (though other types of APIs may have different types of functions, which is not to suggest that other descriptions are limiting), and the set of pairs of the different methods and a given endpoint of the API may correspond to a set of functionality of the API.

Or in some embodiments, the application-layer protocol may not specify a set of methods (for instance in some simple object access protocol (SOAP) application-layer protocols), and functions of the API may be defined without regard to a predefined set of methods of the application-layer protocol.

In some embodiments, an API model may include identifiers of API functions, such as strings that when included in API requests invoke the respective function, and some embodiments may generate API requests in functional tests that include these corresponding strings to invoke functionality to be tested. In some cases, this may include prepending an identifier of a method of the application-layer protocol to a URL and forming the URL by appending an API endpoint to a identifier of the application-layer protocol in the URL, e.g., "GET h-t-t-p-s://api.pets.com/dogs," with "GET" being the method, "h-t-t-p-s://" being the protocol identifier, and "api.pets.com/dogs" being the API endpoint. In some cases, the API endpoint may also be referred to, or be characterized as including, as an identifier of the function, e.g., ("api.pets.com/dogs" or "/dogs"). In some cases, URLs may include a base ("api.pets.com") to which a path ("/dogs") is appended, and the separate components may be distinctly specified in an API model, with test generation in some cases including forming API requests by parsing these components of a URL from the API model and arranging these components to form API requests. In some embodiments, the base may specify a network host at which one of the API servers 14 is reachable.

In some embodiments, API functions may accept parameters, such as more than 2, more than 10, or more than 20 parameters. In some embodiments, different functions may accept different sets of parameters. In some cases, some parameters may be shared across a plurality or all functions of an API, for instance, an API key parameter by which an authentication credential is supplied to the API so that the API can determine whether the API request is authorized by verifying that the authentication credential corresponds to an authorized account. In some cases, API parameters may be expressed as part of a URL, for instance as sub-strings of the URL delimited from other sub strings by a forward slash. In some cases, the parameters may be expressed as a query string appended to the URL, for instance, as a set of key-value pairs collectively delimited from the URL by a question mark, with each key-value pair having a key separated from a value by an equal sign, and adjacent key-value pairs being delimited in the query string by an ampersand. Again, generating API tests may include determining values for the key-value pairs and forming text of API requests that arrange these key-value pairs and URLs in the manner described above.

API models may be expressed or otherwise encoded in a variety of formats. In some embodiments, API models may be a Swagger specification, an Open API specification, or the like. In some embodiments, API models may be expressed in a single document, such as a single file. In some embodiments, API models may be encoded in a text format, for instance, in a hierarchical serialized data format, like JavaScript object notation (JSON), extensible markup language (XML), or yet another markup language (YAML). In some cases, the hierarchical serialized data format may adhere to a schema for describing APIs, which in some cases may specify key values of dictionaries and items to be listed, for instance, indicating which fields are required, which fields are optional, which fields are prohibited, data types for values of fields, formats for values of fields, acceptable ranges or other sets of values for fields, and prohibited ranges or other sets of values for fields.

An example of a portion of an API model is reproduced below:
  swagger: "2.0"
  info:
    title: "dog-info API"

```
version: "1.2"
contact:
name: dogs-R-us
url: "h-t-t-p-s://dogs-r-us.com"
license:
name: Dogs R US License
url: "h-t-t-p-s://dogs-r-us.com/terms-use"
host: api.dogs-r-us.com
basePath: /v1.2
schemes:
-h-t-t-p-s
produces:
-application/json
paths:
/breeds/favorite-search:
get:
operationId: Fav Search
summary: Favorite Search—"Find people's favorite
    breeds of dogs"
description: |
[p]Favorite breed search tells you which breeds of dogs
    people like. [/p]
[p]The search is based on our dog-finder platform, which
    searches hundreds of breeds of dogs and demographic
    data of owners.[/p]
parameters:
-name: apikey
in: query
description: API Key provided for your account, to iden-
    tify you for API access. Make sure to keep this API key
    secret.
required: true
type: string
-name: breed
in: query
description: [a href="[link to list of permitted parameter
    values">international-breed code[/a] lists recognized
    breeds and canonical identifiers.
required: true
type: string
default: "Newfoundland"
-name: geo-region
in: query
description: [a href="[link to region codes]"]region code
    [/a] city in which the dog lives
required: false
type: string
default: "NYC"
-name: birth_date
in: query
description: Range of dates for which breed data is to be
    reported. Dates are specified in the [a href=h-t-t-p-s.//
    en.wikipedia.org/wiki/ISO_8601]ISO 8601[/a] yyyy-
    MM-dd date format. Ranges are inclusive and ranges of
    months will apply from the start to the end of the
    month. If just a single date is specified, only that date
    will be searched. By default, the date range starts today
    and applies up to 361 in the future is applied. Past dates
    are generally not supported, future dates should be in
    the next 361 days, although results start to become
    sparse after about 6 months in the future, as airlines
    may still be defining their schedules. The default is to
    search all future dates available.
required: false
type: string
default: "2015-02-06--2017-10-03"
-name: likes tennis balls
in: query
required: false
type: boolean
default: false
description: Whether the breed likes playing with tennis
    balls.
/breeds/full-search:
get:
operationId: Breed Full Search
summary: Breed Full Search—Find pictures of dogs
    across our entire platform
description: . . . .
```

A short excerpt from a Swagger specification is presented above, but commercial implementations are expected to be substantially longer, e.g., more than 1,000; 2,000; or 10,000 lines.

In some embodiments, the functional-test specification for a given version of an API may specify relatively large number of functional tests. For example, the API may have more than 2, more than 10, or more than 100 different functions, in some cases organized in more than 2, more than 10, or more than 100 sets of functionality of the API. In some cases, each function may have more than 2, more than 10, or more than 100 functional tests that are specified in the functional-test specification, for instance, more than 2, more than 5, or more than 10 for each parameter of the respective function or each permutation of parameters of the respective function. Tests may be specified by defining at least some attributes of the tests that distinguish the tests from other functional tests. Test specifications need not include all of the information by which a test is executed, and a test may be said to have been specified even though the test is subject to further modification, for instance, augmentation with other processes or editing with human intervention.

In some cases, each functional test may include a unique identifier of the functional test that distinguishes the functional test from other functional tests specified in a functional-test specification. In some embodiments, each functional test may include some or all of the text of an API request by which tested functionality is invoked, for instance, by an execution engine like that described below sending the text to the API. In some embodiments, each test specification may include criteria by which a response to the API request is determined to indicate whether the test is passed or failed. In some cases, the criteria may specify a pattern, for instance, with a regular expression, keyword, or string to be matched. In some cases, the presence of the pattern may indicate a passed or failed test, and this may be indicated by the criteria in the respective specification of the test. In some cases, the absence of the pattern may indicate a passed or failed test, and again this may be indicated by the criteria in the respective specification of the test. The term "criteria" is used broadly herein to refer both to the singular criterion and the plural criteria.

In some cases, criteria may include a pattern to be matched to an application-layer protocol response code of a response to an API request. Examples include the hypertext transport protocol response codes, also called status codes, which may be included in a status line of an API response. For instance, a status code of 200 may indicate a successful execution of the invoked functionality, a status code of 500 may indicate a server error in the course of executing the invoke functionality, and a status code of 404 may indicate that resources referenced in the API requests were not found. In some embodiments, the response code may be parsed from an API response and compared to the pattern of the criteria of the respective tests to determine whether the test is passed during testing.

In some cases, API responses may include both a response code and response payload content, and criteria may include a pattern to be matched to the payload content to determine whether a test is passed. Examples include comparing a returns payload content to an expected payload, like verifying that a given API request returns an expected integer or string, does not include a designated value, includes less than a threshold amount of data, includes more than a threshold amount of data, matches to a regular expression, or does not match to a regular expression. Other examples include validating that returned payload content complies with a response schema specified in the API model, for instance, confirming that required fields according to the schema are present, data types of fields corresponding to data of types of return values associated with those fields, and that values are within respective ranges or sets permitted by the schema or are not within respective ranges or sets prohibited by the schema.

In some embodiments, functional-test specifications may be expressed in a single document, such as a single text document in a hierarchical data serialization format, like one of those described above. In some embodiments, the functional-test specification may have a different schema from that of the API model. In some embodiments, the schema of the functional-test specification may indicate fields and values to be mapped to those fields, for example, a test identifier, text of an API request, and criteria by which a response to the API request is determined to indicate whether the test is passed or failed. In some cases, the functional-test specification may be a Taurus test specification or Jenkins test specification. An example of a portion of a functional-test specification is reproduced below:

```
- - -
scenarios:
  GET_/breeds/fav-breeds-search_negative:
    requests:
    -url:    "h-t-t-p-s://api.dogs-r-us.com/v1.2/breeds/breed-
         fare-
         search?apikey=${apikey}&origin=BOS&destination=
         LON&start-birth_date=2017-08-25&end-birth_
         date=2017-08-28&geozip=78701"
     label: "n0_GET_59e62a635aa07100011f795b"
     assert:
     -subject: "http-code"
      regexp: true
      not: false
      contains:
      -"(4\\d{2}|5\\d{2})"
      assume-success: true
      assert-jsonpath: [ ]
    -url:    "h-t-t-p-s://api.dogs-r-us.com/v1.2/breeds/breed-
         fav-search? apikey=$ {apikey} &geo-region=ATX & birth-
         date=2017-08-28T08:00number_of_results=5"
     label: "n1_GET_59e62a635aa07100011f795b"
     assert:
     -subject: "http-code"
      regexp: true
      not: false
      contains:
      -"(4\\d{2}|5\\d{2})"
      assume-success: true
      . . . .
```

The above excerpt from a Taurus test specification is relatively short compared to commercial implementations, which may include hundreds or thousands of tests.

The illustrated computing environment 10 includes three pairs of API servers and respective API models 14 and 16 for APIs exposed by the service. Commercial embodiments, however, are expected to include substantially more, for example, more than 10, more than 100, or more than 1000 different pairs of API servers and respective API models. In some embodiments, these APIs may be hosted by diverse sets of entities, some of which may be different from API consumer developers. Similarly, three sets of developer computing devices 20 and API consumer processes 18 are shown, but commercial embodiments are expected to include substantially more, for instance more than 10, more than 100, more than 1000, more than 10,000, or more than 100,000. Similarly, a single developer computing device 20 are shown for each API consumer 18, but some implementations may include substantially more developer computing devices, and some developer computing devices may service a plurality of different API consumer processes 18. Consumer processes 18 may call various ones of the API servers to invoke functionality thereof. In some cases, a consumer process 18 and API server 14 may both be services of a service oriented architecture distributed application, like a microservices application.

API servers 14 may host a wide variety of different types of APIs that communicate via any of the above-described application-layer protocols or similar protocols. In some embodiments, the API servers 14 may host any of the above-described types of APIs or similar APIs, which may range from inter-process communications within a single computing device to REST-based communication and a client-server architecture. For example, API servers 14 may host APIs by which structured data is conveyed to API consumers 18 to populate graphical user interfaces, populate templates, expose program state of a distributed application to a native application executing on a consumer computing device, and the like. For example, some API servers 14 may be configured to output structured data in a hierarchical data serialization format, like JSON or XML, in accordance with a data schema of the API.

Similarly, API consumer processes 18 may be any of a diverse universe of processes configured to interact with an API. In some embodiments, consumer processes 18 may be configured to write data to server-side storage via the API, read data from server-storage via the API, request that data sent to the API or accessed server-side be transformed in some manner requested by an API request by the server-site processes, or otherwise invoke functionality of the API through API requests. Requests may also be referred to as commands or instructions. In some embodiments, the API consumer processes may have associated source code hosted in repositories that is manipulated by developer computing devices 20, for instance, in accordance with various development processes, like agile development practices. In some cases, manipulated source code may undergo a build process in which executable machine code or byte code is built from source code and related dependencies before being deployed on computing devices executing the API consumer processes 18.

In some embodiments, as part of this build process, some embodiments may interrogate a manifest of the code (or executable portions of the code itself) to identify APIs with which the consumer-side code interacts and request the testing application 12 to execute a functional test of each of those APIs based on corresponding functional-test specifications. Further, in some cases, the developer computing devices 20 or API consumer processes 18 may register a callback functions or otherwise subscribe to communication channels by which changes in versions of APIs are announced, and some embodiments may respond to such a notice by requesting the testing application 12 to generate a new functional-test specification of the new version based upon a new API model corresponding to the new version of the API.

In some cases, a given API, and a given version of that API, may have a plurality of different functional-test specifications generated by and stored in the testing application 12 on behalf of different API consumer processes 18 having different testing requirements. In some cases, these testing requirements may be expressed in a functional test policy corresponding to a tenant account of an entity controlling the API consumer processes 18, and functional-test specifications may be generated based on these policies. Examples include a policy specifying that security tests are not to be applied (or vice versa), that a particular amount of time is to be used as a threshold for timeouts, that certain parameters are types of parameters are to be tested or not to be tested, and the like.

In some embodiments, the testing application 12 may be a hosted distributed application, for instance, provided according to a software as a service (SaaS) model, or may be partially or entirely hosted on premises of an entity controlling API servers 14, API consumer processes 18, or a combination thereof. In some embodiments, the testing application 12 may be executed within a single computing device, for instance, with different modules described herein corresponding to different subsets of source code in a single process or multiple processes. In some embodiments, the testing application 12 may be executed on multiple virtualized or non-virtualized host operating systems, in some cases on multiple virtual machines, and in some cases on multiple computing devices. In some embodiments, different subsets of functionality may be implemented on different hosts, for instance, in a service-oriented architecture, like a micro-services architecture to afford relatively robust scaling of the testing application 12, in some cases elastically responsive to load. In some embodiments, different services may be implemented on replicated hosts, for example, behind load balancers to afford increased scalability.

In some embodiments, the testing application 12 includes a server 24, such as a nonblocking server through which the testing application 12 communicates with other components of the computing environment 10 via the network 21. In some embodiments, the testing application 12 further includes a controller 22 that services requests sent to the servers 24 and provides responses via the server 24, in some cases by controlling other components of the testing application 12 to implement the processes described below with reference to FIGS. 2 and 3. In some embodiments, the testing application 12 further includes an execution engine 26 configured to execute the process described below with reference to FIG. 3 to test functionality of an API based upon a functional-test specification. Some embodiments may include a view generator 28 configured to access logged test results and generate graphical user interfaces, alarms, and other reports indicative of test results for presentation on developer computing devices 20. Some embodiments may further include a test specification repository 30, which may host a plurality of documents like those described above in which functional tests are specified, in some cases in association with corresponding identifiers of APIs, versions of those API, and tenants of the testing application on whose policy the functional-test specification is based. Some embodiments may also include a test result repository 32 to which test results indicating which tests are passed or failed and corresponding unique test identifiers are logged, and the view generator 28 may generate views based on these records. The illustrated repositories may be relational databases, document databases, no SQL databases, graph databases, key-value stores, or any of a variety of other data repositories.

In some embodiments, the functional test generator 34 may execute the process described below with reference to FIG. 2 to generate functional-test specifications based on API models. In some embodiments, the functional test generator 34 includes a model parser 36, a parameter-set generator 38, an API-request generator 40, a response-criteria generator 42, a test generator 44, and a functional-test specification generator 46.

In some embodiments, the model parser 36 may be configured to load an API model into program memory and parse the API model to populate program state with a data model of API models of the functional-test generator. Some embodiments may maintain relationships between entities expressed in the API model in the data model of program state, and some embodiments may maintain the identity of different data elements in the data model of program state. Examples include converting a hierarchical serialized data format document into a collection of objects in an object-oriented programming language having attributes corresponding to lower-levels of a hierarchy in the document relative to an entry corresponding to the object. Other examples include converting a hierarchical serialized data format document into a hierarchical arrangement of lists and dictionaries in key-value pairs. In some embodiments, the model parser 36 is configured to detect an API model schema identified in text of the API model and converts different API model schema representations into a unified schema of the functional-test generator 34, for instance, with a different schema converter for different API specifications. In some cases, the resulting data model loaded in program state may be accessible to the parameter-set generator 38, the API-request generator 40, and the response-criteria generator 42.

In some embodiments, the parameter-set generator 38 may be configured to determine for a given function of the API to be tested and for a given test, both which parameters are to be included in the testing API request and values of those parameters. Some embodiments may systematically vary both which parameters are included and values of those parameters to systematically test different attributes of functionality. In some embodiments, the systematic variation may follow a pattern that is lower entropy than is typically used in fuzzing, where parameter values are randomly varied and testing can take substantially longer, though some embodiments are also consistent with random variation of parameters and fuzzing, for instance, of some subsets of the parameters. In some cases, some parameter sets and some tests may be designated (e.g., according to a policy) for both functional and performance testing, just for functional testing, or just for performance testing.

For example, some embodiments may determine that a given test will test the response of the API to the absence of a parameter designated as required in the API model. To this end, some embodiments of the parameter-set generator 38 may omit the parameter to be tested entirely (that is omits both the key and the value in embodiments in which parameters are communicated in a key-value format) or omits a value of the parameter to be tested (that is includes the key but not the value in such embodiments), or specify two tests that respectively test these two variations.

In some embodiments, the remainder of the parameters that are required according to the API model 16 may be included in the parameter set for this test and values of those parameters may be selected to be set to default values identified in the API model or otherwise known-safe values that, standing alone, will not cause a test to fail to isolate the effect of the parameter under test. This approach to isolating one parameter at a time may be applied to each of the sets of parameters generated by the parameter set generator 38, or some embodiments may test interactions, for instance, testing each permutation of parameters with safe and unsafe values, e.g. in a function with three parameters, testing unsafe A, safe B, safe C; then testing unsafe A, unsafe B, and safe C; then testing safe A, unsafe B, and unsafe C; and then testing unsafe A, unsafe B, and unsafe C. Some embodiments may specify a test procedure that conditionally branches based on whether criteria are satisfied, e.g., testing multiple parameters and then, responsive to results and based on the test specification, selectively traversing branches that test different subsets of the parameters to isolate the source of unexpected behavior when several parameters are tested concurrently in a root node of such a tree.

In some embodiments, the value of the parameter or parameters for which an effect is being tested may be selected based on a type of failure mode being tested, which may in some cases may be expressed in a policy of a tenant requesting the functional-test specification to be generated. Or some embodiments may generate the same set of tests for different tenants with a uniform policy or default policy. One example is described above: omitting a parameter designated as required. Other examples include adding parameters to a parameter set that are not indicated as being permitted, like extra key-value pairs, in a parameter-set that is generated to test the effect of unexpected data provided in API requests. Examples include selecting a value for a parameter that is of a different data type from that indicated as being required for the parameter in the API model, like selecting a string for a parameter designated as an integer data type or vice versa. Examples include selecting a value for a parameter that is of a different format from a format indicated as being required for the parameter in the API model, like using a different date format, street-address format, phone number format, account number format, or the like. Examples include selecting a value for a parameter that is outside a range indicated is being permitted for the parameter in the API model, like using a date that has not yet occurred, indicating a negative mass, indicating an age greater than 120 years, or the like. And examples also include selecting a value for a parameter that is outside a set indicated is being permitted for the parameter by the API model. For instance, an API model may indicate that an eye-color parameter may only be one of three designated colors (brown, green, or blue), and embodiments may select a value of orange to test in an API request. Examples further include selecting a value for a parameter that is inside a range indicated as being prohibited for the parameter by the API model and selecting a value for the parameter that is inside a set indicated as being prohibited for the parameter in the API model.

The preceding are examples of parameter selection suitable for negative functional tests and negative edge functional tests. In some embodiments, values of parameters may also be selected to test positive functional tests and positive edge functional tests. In some embodiments, negative tests (edge or otherwise) are expected to yield an error for a normal (e.g., passing) response in at least some aspect indicating that the API is properly handling the parameter configured inconsistently with requirements of the API model. These responses are expected from a properly functioning API when an API consumer incorrectly requests functionality of the API according to the API model, e.g., by contradicting implicit or explicit dictates of the API model, at least in scenarios in which the respective test is deemed passed. In some embodiments, negative tests (edge or otherwise) are failed when the API model does not return an error or no response in at least some aspect (e.g., a null value in a response payload). In some embodiments, positive tests (edge or otherwise) are expected to yield a response consistent with described functionality in the API model in cases in which the test is deemed passed and vice versa. Edge tests are designed to invoke different branches of program flow in one or more processes implementing the API from that invoked in non-edge tests. Non-edge tests may invoke a branch of program flow that is followed most often during usage of the API.

As noted, some embodiments may further include an API-request generator 40. In some cases, this component may parse sub-strings from the API model that correspond to different parts of an API request and arrange those sub-strings in an API request, which in some cases may also include the parameters identified by the parameter-set generator 38. In some cases, this may include arranging an application-layer protocol identifier, a method of the application-layer protocol, an API endpoint, a host address, and a sequence of the generated set of parameters with appropriate delimiters like those described above for query strings in a single string. In some embodiments, this string may include a portion that is replicated across a plurality of different functional tests where the only portion of the string that changes are different ones of the parameters. Similarly, different groups of functional tests may include the same host identifier but may have a path, or API endpoint identifier, that varies between the different groups of functional tests.

Some embodiments may further include a response-criteria generator 42 configured to generate for each functional test a corresponding criteria by which an API response to the test is determined to indicate the test is passed or failed. "Generation" here and elsewhere in this document can include retrieving a previously composed value from memory by selecting the appropriate value, aggregating different values that were previously stored, or calculating some or all of the generated output. In some embodiments, the response criteria generator may generate criteria that indicate whether a matched pattern of the criteria indicates the test is passed or failed. In some embodiments, the patterns may take a variety of different forms, including whitelists or blacklists of keywords or substrings or numerical values, regular expressions, terms with which a response must be within some threshold edit distance, or the like.

In some embodiments, the output of modules 38, 40, and 42 may be supplied to a functional test generator 44, which may arrange these outputs in a functional-test specification for a given test. In some embodiments, this may include arranging these different components in a set of labeled data elements corresponding to different parts of the test. In some embodiments, each of a relatively large number of functional tests specifications may then be input into the functional-test specification generator 46, which may arrange the collection of functional-test specifications in a document or other record, like a hierarchical serialized data format encoding suitable for committing to persistent storage.

Figure 2:
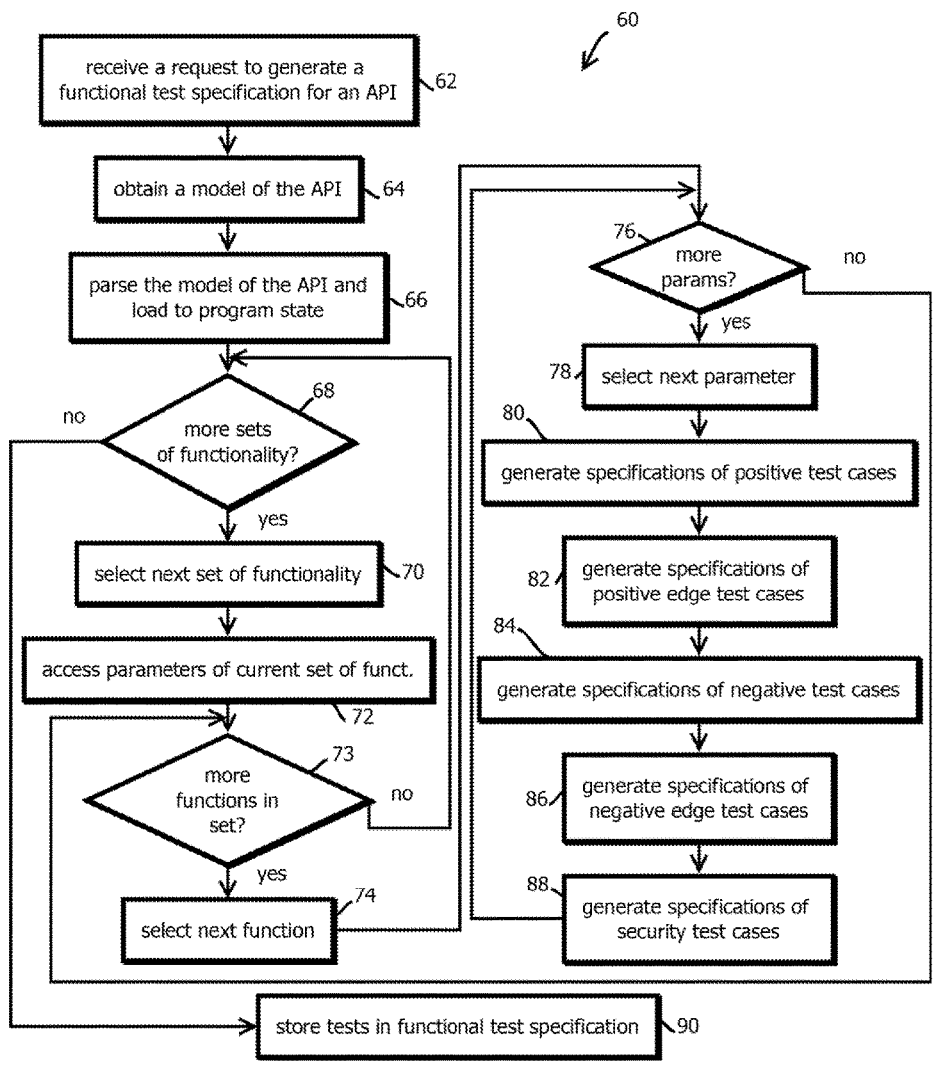
FIG. 2 is a flowchart of an example of a process to generate a functional-test specification from an API model in accordance with some embodiments of the present techniques.

FIG. 2 shows an example of a process 60 by which functional-test specifications may be generated based upon API models. In some embodiments, the process 60 and the other functionality described herein may be implemented with a tangible, non-transitory, machine-readable medium storing instructions that when executed by one or more processors effectuate the described functionality. The term "medium" in the singular is broadly used to refer to implementations in which multiple instances of media store different subsets of the instructions executable by different processors, for instance, on different computing devices, and instances in which the same physical media stores all of the instructions, for instance, for execution on a single computing device. This and the other processes described herein may have operations omitted, operations may be executed in a different order from that shown, some operations may be repeated, subsets of the operations may be executed concurrently or serially, or the processes may otherwise be varied, none of which is to suggest that any other description herein is limiting.

Some embodiments of the process include receiving a request to generate a functional-test specification for an API, as indicated by block 62. Some embodiments may then obtain a model of the API, as indicated by block 64, and parse the model of the API and load the data to program state, as indicated by block 66. In some cases, models may be parsed in advance of receiving the request or in response to receiving the request, none of which is to suggest that any other description herein is limiting. Some embodiments may then determine whether there are more sets of functionality described by the model of the API to process, as indicated by block 68. As illustrated, some embodiments may iterate or current currently process different sets of functionality through the below describe loops. In some cases, a set of functionality is a single function exposed by an API, or in some cases a set of functionality is a group of functions, for instance sharing an API endpoint, with different application-layer protocol methods invoking different functions within the group for the API endpoint. In some cases, all of the functions in a group may share the same set of parameters, or different functions within such a group (also referred to as a set) may have different sets of parameters specified in an API model.

Some embodiments may then select the next set of functionality to process, as indicated by block 70 and access parameters of the current selected set of functionality, as indicated by block 72, for instance, a specification of parameters in the model of the API. Some embodiments may then determine whether there are more functions in the current selected set, as indicated by block 73. Again, embodiments may serially or concurrently process each of the functions in the below-describe loop. Upon determining there are more functions to process, some embodiments may select a next function, as indicated by block 74, and proceed to determine whether there are more parameters of the function to process, as indicated by block 76. Again, the following described loops may be executed concurrently or serially to process each of the parameters. Some embodiments may determine whether there are more permutations of parameters to process in block 76 and generate sets of tests for each permutation of parameters.

Upon determining that there are more parameters to process, some embodiments may select a next parameter among the unprocessed parameters, as indicated by block 78. Embodiments may then systematically vary values and the presence of that parameter to generate various types of functional-test specifications, for instance, in the manner described above. To this end, some embodiments may generate specifications of positive test cases, as indicated by block 80. Some embodiments may test a single positive test case for all of the parameters, and some embodiments may test a plurality of different positive test cases, for instance, across the range, holding each of the parameters other than one constant across the tests. Some embodiments may further generate specifications of positive edge test cases, as indicated by block 82. In some cases, values of parameters for positive edge cases may be determined based upon the API model, for instance, selecting values at (and within) the edges of permitted ranges, selecting values expected to invoke different branches of program flow (like zero, negative values, dates before after the millennium, and the like). Some embodiments may test a plurality of different positive edge cases for a given parameter and generate corresponding functional-test specifications in block 82. Some embodiments may further generate specifications of negative test cases, as indicated by block 84. As noted, negative test cases may take a variety of different forms, and embodiments may generate a plurality of negative test cases for a given parameter in which the given parameter takes different values expected to be inconsistent with the model of the API in different ways. Similarly, some embodiments may generate specifications of negative edge test cases, as indicated by block 86, in some cases generating a plurality of different types of such negative edge test cases. Some embodiments may further generate specifications of security test cases, as indicated by block 88, for instance, by assigning values to the current selected parameter that are configured to cause a buffer overflow or include executable code.

Program flow may return to block 76, where more parameters or more permutations of parameters may be evaluated if they remain. Otherwise, program flow may return to block 73, where it may be determined whether there are more functions in the current selected set of functionality. Upon determining that there are no more functions in the current selected set of functionality, program flow may return to block 68, and embodiments may determine whether there are more sets of functionality to process. Upon determining that there are no more sets of functionality to process, program flow may proceed to block 90, and embodiments may store the tests in a functional-test specification.

Figure 3:
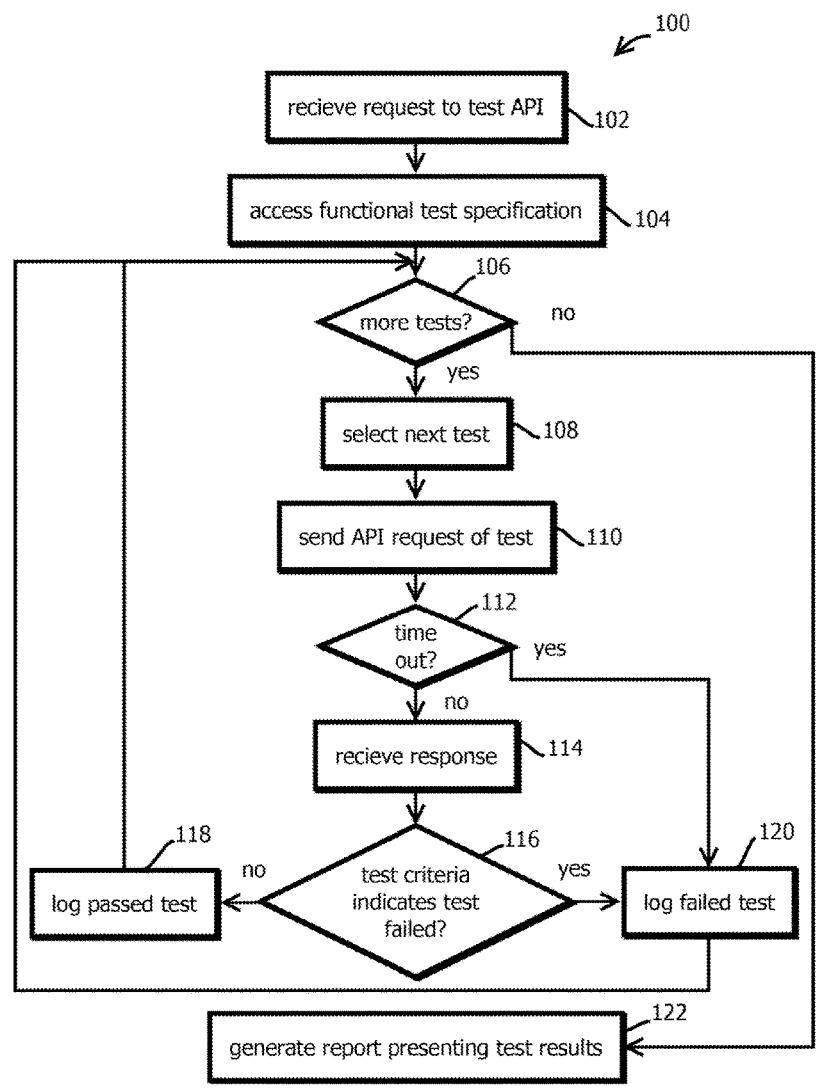
FIG. 3 is a flowchart of an example of a process to perform functional testing of an API in accordance with some embodiments of the present techniques.

FIG. 3 shows an example of a process 100 by which an API may be tested. Embodiments may include receiving a request to test the API, as indicated by block 102, and accessing a functional-test specification corresponding to the API identified in the request, as indicated by block 104. Embodiments may determine whether there are more tests in the accessed functional-test specification to process, as indicated by block 106. Upon determining there are more tests, some embodiments may select a next test in the functional-test specification, as indicated by block 108. Some embodiments may send API requests of the tests, as indicated by block 110. In some cases, the full text of an API requests may be specified in the test specification, and embodiments may parse this text from the specification and send the text to an API server. Some embodiments may determine whether an API response is received within a threshold duration of time after sending the API requests, as indicated by block 112. Causing a determination that the test did not time out, embodiments may receive a response, as indicated by block 114. Embodiments may then compare the response to test criteria and determine whether the test criteria indicated the test is failed, as indicated by block 116. Upon determining that the test criteria do not indicate the test was failed, embodiments may log the test as having been passed, as indicated by block 118. Upon determining that the test criteria indicate the test was failed, embodiments may log the failed test, as indicated by block 120. After blocks 118 and 120, embodiments may return to block 106 to determine whether there are more tests to process. Upon determining that there are no more tests to process, some embodiments may generate a report presenting the test results, as indicated by block 122, for instance, by sending instructions to a user computing device that cause the user computing device to display a dashboard or other graphical user interface indicating which tests were failed and which tests were passed (or aggregate metrics based thereon, like pass rate, or classification of aggregate results as failing or passing). In some embodiments, a timeout may be logged is a failed test. In some embodiments, the loop following block 106 may be repeated concurrently for different tests, or the loop may be executed serially for each of the tests in the functional-test specification.

Figure 4:
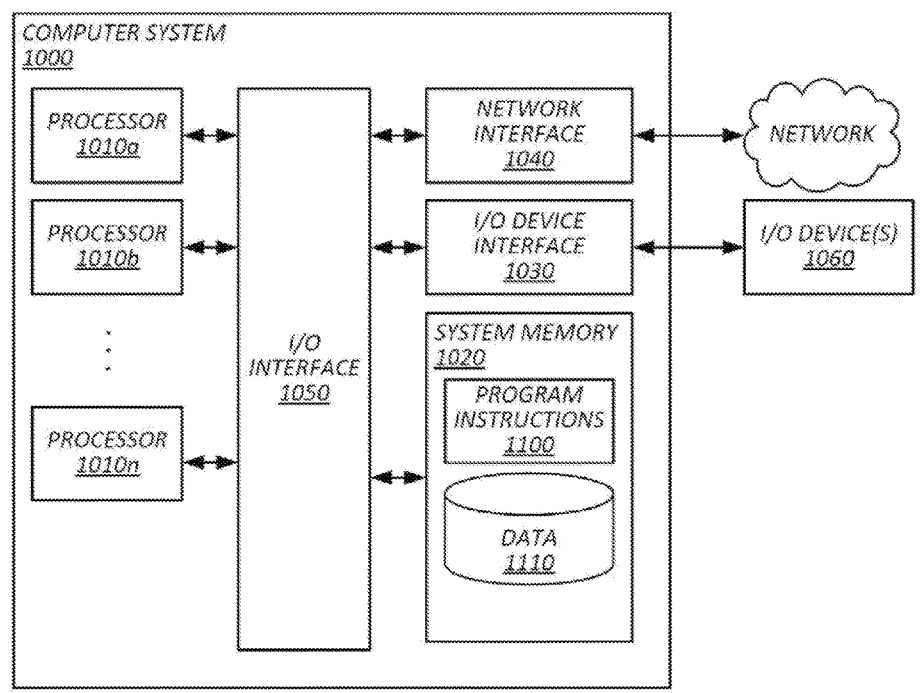
FIG. 4 is a physical and logical architecture block diagram showing an example of a computing device upon which the present techniques may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A method of configuring a test of an application program interface, the method comprising: obtaining, with one or more processors, a model of an application program interface ("API"), wherein: the model of the API describes how to interact with the API, the model of the API comprises a first identifier of a first set of functionality exposed by the API, the model of the API associates with the first identifier a first set of a plurality parameters of at least some functions of the first set of functionality and by which at least some functionality of the first set of functionality is invoked in API requests, at least in part, by specifying values of respective parameters in API requests, and the model of the API is distinct from source code of one or more processes implementing functionality of the API; receiving, with one or more processors, a request to generate a functional-test specification for the API, the functional-test specification specifying a plurality of tests of functionality of the API with test cases specified by the functional-test specification; detecting, with one or more processors, sets of functionality identified by the model of the API and respective sets of parameters corresponding to the detected sets of functionality by parsing the model of the API; in response to receiving the request, generating, with one or more processors, the functional-test specification for the API by, for at least some respective detected sets of functionality, specifying respective sets of functional tests based on corresponding sets of parameters, wherein: specifying respective sets of tests comprises specifying a first set of tests of the first set of functionality, the first set of tests comprises respective positive test cases that test different respective subsets of parameters among the first set of the plurality of parameters, the positive test cases have values of respective parameters in different respective subsets of parameters that correctly invoke functionality of the API in the first set of functionality, the first set of tests comprises respective negative test cases that test different respective subsets of parameters among the first set of the plurality of parameters, the negative test cases have values of respective parameters in different respective subsets of parameters that incorrectly invoke functionality of the API in the first set of functionality, and specifications of tests among the first set of tests comprise respective criteria by which API responses to respective tests are determined to pass or fail respective tests; and storing, with one or more processors, the functional-test specification in memory.

2. The method of embodiment 1, wherein: the model of the API is a human-readable, structured-data description of the API in a document encoded in a hierarchical data serialization format; the model comprises descriptions of a plurality of different sets of functionality including the first set of functionality; different sets of functionality correspond to different API endpoints; respective endpoints are accessible by sending an application-layer request via a network to a corresponding uniform-resource locator (URL) that includes an identifier of the corresponding set of functionality associated with the corresponding set of functionality in the model of the API; identifiers of the sets of functionality in the model of the API include respective paths, or portions thereof, included in the corresponding URLs; the model of the API specifies how to form a plurality of URLs configured to invoke respective sets of functionality of the API; the model of the API includes a base-path of the API that is included in a root URL of each of the plurality of URLs; the model of the API includes a network host identifier that is included in the root URL of each of the plurality of URLs; the model of the API includes a version-identifier of the API that distinguishes a version of the API described by the model of the API from other versions of the API described by other models; the model of the API specifies an application-layer protocol by which functionality of the API is invoked; at least some of the endpoints include a plurality of different functions in the corresponding set of functionality; the plurality of different functions correspond to different respective application-layer protocol methods; the same given application-layer protocol method invokes different functions in different sets of functionality depending on which endpoint of the API is associated with the given application-layer protocol method in API requests; the model of the API describes different functions corresponding to different pairs of application-layer protocol methods and endpoints; at least some of the endpoints are associated with a plurality of parameters corresponding to key-value pairs of query-strings appended to corresponding URLs; the key-value pairs include a key corresponding to a parameter identifier of an API key by which API requests are determined to be authorized; the model of the API indicates that at least some parameters are required for at least some endpoints; the model of the API indicates that at least some parameters are optional for at least some endpoints; the model specifies data types of parameters and the data types include an integer data type and a string data type; the model of the API includes descriptions of sets of responses to API requests corresponding to respective pairs of application-layer protocol methods and endpoints corresponding to API requests; and at least some of the descriptions of sets of responses include an application-layer protocol response code indicative of a correct invocation of functionality.

3. The method of any one of embodiments 1-2, wherein: the functional-test specification is a human-readable, structured-data description of the API in a document encoded in a hierarchical data serialization format; the functional-test specification includes specifications of at least 10 different functional tests of functionality of a given function in the first set of functionality; at least some of the specifications of functional tests include respective strings encoding corresponding API requests by which corresponding functionality is invoked for testing; and generating the functional-test specification comprises forming the respective strings encoding corresponding API requests by: parsing portions of the strings from the model of the API, arranging the portions of the strings in an order indicated by the model of the API, determining values for parameters by systematically varying the values to test different failure modes, and including the determined values for the parameters in respective strings of corresponding tests that test the API response to API requests including the determined values.

4. The method of any one of embodiments 1-3, wherein generating the functional-test specification for the API comprises: loading a document encoding the model into program state with the parsing; and for each set of functionality specified in program state, for each function in the respective set, for each parameter of the respective function, performing operations comprising: obtaining a first value of the respective parameter of a type, format, and among a set for which the API is designed to respond correctly and generating a positive test case assigning the first value to the respective parameter in text specifying an API request configured to invoke the respective function; obtaining a second value of the respective parameter of a type for which the API is not designed to respond correctly and generating a negative test case assigning the second value to the respective parameter in text specifying an API request configured to invoke the respective function; obtaining a third value of the respective parameter in a format which the API is not designed to respond correctly and generating a negative test case assigning the third value to the respective parameter in text specifying an API request configured to invoke the respective function; and obtaining a fourth value of the respective parameter in a set for which the API is not designed to respond correctly and generating a negative test case assigning the fourth value to the respective parameter in text specifying an API request configured to invoke the respective function.

5. The method of any one of embodiments 1-4, wherein: the first set of tests comprises a positive edge-case functional test and negative edge-case functional test; the positive edge-case functional test invokes a different branch of program flow of code implementing the API from one or more branches of program flow of positive test cases; and the negative edge-case functional test tests whether the API returns an error for a value of a parameter that is outside of a permitted set.

6. The method of any one of embodiments 1-5, wherein: specifying respective sets of functional tests based on respective sets of parameters comprises specifying a second set of tests of a second set of functionality of the API; the second set of tests comprises: a plurality of positive test cases in which respective values of respective parameters are configured to correctly invoke functionality of the API; a plurality of positive edge test cases in which respective values of respective parameters are configured to correctly invoke functionality of the API; a plurality of negative test cases in which respective values of respective parameters are configured to incorrectly invoke functionality of the API; a plurality of negative edge test cases in which respective values of respective parameters are configured to incorrectly invoke functionality of the API; and a plurality of code injection test cases in which respective values of respective parameters are configured to determine whether the respective values cause the API to execute program code included in respective values.

7. The method of any one of embodiments 1-6, wherein specifying respective sets of functional tests based on respective sets of parameters comprises at least two of the following: determining that the model of the API indicates a first parameter is required for a first function and generating a first specification of a first test case, the specification of the first test case comprising: text of a first API request in which a value of the first parameter is omitted; and a first criterion having a first pattern to be matched to a first response to the first API request to determine whether the first response indicates an error was detected by one or more processes implementing the API; determining that the model of the API does not indicates a second parameter is permitted for a second function and generating a second specification of a second test case, the specification of the second test case comprising: text of a second API request in which a value of the second parameter is included; and a second criterion having a second pattern to be matched to a second response to the second API request to determine whether the second response indicates an error was detected by one or more processes implementing the API; determining that the model of the API indicates a third parameter has an integer data type for a third function and generating a third specification of a third test case, the specification of the third test case comprising: text of a third API request in which a value of the third parameter is not an integer data type; and a third criterion having a third pattern to be matched to a third response to the third API request to determine whether the third response indicates an error was detected by one or more processes implementing the API; determining that the model of the API indicates a fourth parameter is to be expressed in a specified date format for a fourth function and generating a fourth specification of a fourth test case, the specification of the fourth test case comprising: text of a fourth API request in which a value of the fourth parameter is not expressed in the specified date format; and a fourth criterion having a fourth pattern to be matched to a fourth response to the fourth API request to determine whether the fourth response indicates an error was detected by one or more processes implementing the API; determining that the model of the API indicates a fifth parameter is to be within a specified range for a fifth function and generating a fifth specification of a fifth test case, the specification of the fifth test case comprising: text of a fifth API request in which a value of the fifth parameter is not in the specified range; and a fifth criterion having a fifth pattern to be matched to a fifth response to the fifth API request to determine whether the fifth response indicates an error was detected by one or more processes implementing the API; determining that the model of the API indicates a sixth parameter is a parameter of a sixth function and generating a sixth specification of a sixth test case, the specification of the sixth test case comprising: text of a sixth API request in which a value of the sixth parameter is executable structured query language code; and a sixth criterion having a sixth pattern to be matched to a sixth response to the sixth API request to determine whether the sixth response indicates the structured query language code was executed by one or more processes implementing the API; determining that the model of the API indicates a seventh parameter is a parameter of a seventh function and generating a seventh specification of a seventh test case, the specification of the seventh test case comprising: text of a seventh API request in which a value of the seventh parameter is a command executable by a command line input of an operating system; and a seventh criterion having a seventh pattern to be matched to a seventh response to the seventh API request to determine whether the seventh response indicates the command was executed by one or more operating systems in which processes implementing the API execute; or determining that the model of the API indicates an eighth parameter is a parameter of a eighth function and generating an eighth specification of an eighth test case, the specification of the eighth test case comprising: text of an eighth API request in which a value of the eighth parameter is configured to cause a buffer overflow; and an eighth criterion having an eighth pattern to be matched to an eighth response to the eighth API request to determine whether the eighth response indicates one or more processes implementing the API experienced a buffer overflow.

8. The method of any one of embodiments 1-7, wherein specifying respective sets of functional tests based on respective sets of parameters comprises all but two of the following: determining that the model of the API indicates a first parameter is required for a first function and generating a first specification of a first test case, the specification of the first test case comprising: text of a first API request in which a value of the first parameter is omitted; and a first criterion having a first pattern to be matched to a first response to the first API request to determine whether the first response indicates an error was detected by one or more processes implementing the API; determining that the model of the API does not indicates a second parameter is permitted for a second function and generating a second specification of a second test case, the specification of the second test case comprising: text of a second API request in which a value of the second parameter is included; and a second criterion having a second pattern to be matched to a second response to the second API request to determine whether the second response indicates an error was detected by one or more processes implementing the API; determining that the model of the API indicates a third parameter has an integer data type for a third function and generating a third specification of a third test case, the specification of the third test case comprising: text of a third API request in which a value of the third parameter is not an integer data type; and a third criterion having a third pattern to be matched to a third response to the third API request to determine whether the third response indicates an error was detected by one or more processes implementing the API; determining that the model of the API indicates a fourth parameter is to be expressed in a specified date format for a fourth function and generating a fourth specification of a fourth test case, the specification of the fourth test case comprising: text of a fourth API request in which a value of the fourth parameter is not expressed in the specified date format; and a fourth criterion having a fourth pattern to be matched to a fourth response to the fourth API request to determine whether the fourth response indicates an error was detected by one or more processes implementing the API; determining that the model of the API indicates a fifth parameter is to be within a specified range for a fifth function and generating a fifth specification of a fifth test case, the specification of the fifth test case comprising: text of a fifth API request in which a value of the fifth parameter is not in the specified range; and a fifth criterion having a fifth pattern to be matched to a fifth response to the fifth API request to determine whether the fifth response indicates an error was detected by one or more processes implementing the API; determining that the model of the API indicates a sixth parameter is a parameter of a sixth function and generating a sixth specification of a sixth test case, the specification of the sixth test case comprising:

text of a sixth API request in which a value of the sixth parameter is executable structured query language code; and a sixth criterion having a sixth pattern to be matched to a sixth response to the sixth API request to determine whether the sixth response indicates the structured query language code was executed by one or more processes implementing the API; determining that the model of the API indicates a seventh parameter is a parameter of a seventh function and generating a seventh specification of a seventh test case, the specification of the seventh test case comprising: text of a seventh API request in which a value of the seventh parameter is a command executable by a command line input of an operating system; and a seventh criterion having a seventh pattern to be matched to a seventh response to the seventh API request to determine whether the seventh response indicates the command was executed by one or more operating systems in which processes implementing the API execute; or determining that the model of the API indicates an eighth parameter is a parameter of a eighth function and generating an eighth specification of an eighth test case, the specification of the eighth test case comprising: text of an eighth API request in which a value of the eighth parameter is configured to cause a buffer overflow; and an eighth criterion having an eighth pattern to be matched to an eighth response to the eighth API request to determine whether the eighth response indicates one or more processes implementing the API experienced a buffer overflow.

9. The method of any one of embodiments 1-8, wherein: at least some of the criteria specify either application-layer protocol response codes that indicate a passed test or application-layer protocol response codes that specify a failed test.

10. The method of any one of embodiments 1-9, wherein: at least some of the criteria specify either response payload content indicating a passed test or response payload content indicating a failed test.

11. The method of any one of embodiments 1-10, comprising: receiving a request to test the API; and in response to receiving the request, accessing the functional-test specification in memory and testing the API by: sending API requests specified in the functional-test specification; receiving API responses to the API requests; and determining whether the API responses indicate corresponding tests are passed by comparing the API responses to corresponding criteria of the functional-test specification by which API responses to respective tests are determined to pass or fail respective tests.

12. The method of embodiment 11, comprising: before testing the API, causing a user interface to be presented on a user computing device by which the functional-test specification is edited; and changing the functional-test specification responsive to inputs to the user interface from a user.

13. The method of any one of embodiments 1-12, wherein: the functional-test specification specifies more than 1000 different specifications of different functional tests generated programmatically based on the model of the API.

14. The method of any one of embodiments 1-13, wherein: generating the functional-test specification comprises steps for generating a functional-test specification.

15. The method of any one of embodiments 1-14, wherein: the request to generate a functional-test specification for the API is automatically generated as part of a build process of code configured to invoke the API or as part of a build process of code configured to implement the API.

16. The method of any one of embodiments 1-15, comprising: testing functionality of the API with the functional-test specification; load testing the API; and providing one or more reports on functional testing results and load testing results.

17. A tangible, non-transitory, machine-readable medium storing instructions that when executed by a data processing apparatus cause the data processing apparatus to perform operations comprising: the operations of any one of embodiments 1-16.

18. A system, comprising: one or more processors; and memory storing instructions that when executed by the processors cause the processors to effectuate operations comprising: the operations of any one of embodiments 1-16.

What is claimed is:
1. A method of configuring a test of an application program interface, the method comprising:
   obtaining, with one or more processors, a model of an application program interface ("API"), wherein:
      the model of the API describes how to interact with the API,
      the model of the API comprises a first identifier of a first set of functionality exposed by the API,
      the model of the API associates with the first identifier a first set of a plurality parameters of at least some functions of the first set of functionality and by which at least some functionality of the first set of functionality is invoked in API requests, at least in part, by specifying values of respective parameters in API requests, and
      the model of the API is distinct from source code of one or more processes implementing functionality of the API;
   receiving, with one or more processors, a request to generate a functional-test specification for the API, the functional-test specification specifying a plurality of tests of functionality of the API with test cases specified by the functional-test specification;
   detecting, with one or more processors, sets of functionality identified by the model of the API and respective sets of parameters corresponding to the detected sets of functionality by parsing the model of the API;
   in response to receiving the request, generating, with one or more processors, the functional-test specification for the API by, for at least some respective detected sets of functionality, specifying respective sets of functional tests based on corresponding sets of parameters, wherein:
      specifying respective sets of tests comprises specifying a first set of tests of the first set of functionality,
      the first set of tests comprises respective positive test cases that test different respective subsets of parameters among the first set of the plurality of parameters,
      the positive test cases have values of respective parameters in different respective subsets of parameters that correctly invoke functionality of the API in the first set of functionality,
      the first set of tests comprises respective negative test cases that test different respective subsets of parameters among the first set of the plurality of parameters,
      the negative test cases have values of respective parameters in different respective subsets of parameters that incorrectly invoke functionality of the API in the first set of functionality, specifications of tests among the first set of tests comprise respective criteria by which API responses to respective tests are determined to pass or fail respective tests, and generating the functional-test specification comprises forming the respective strings encoding corresponding API requests by:
- parsing portions of the strings from the model of the API,
- arranging the portions of the strings in an order indicated by the model of the API,
- determining values for parameters by systematically varying the values to test different attributes of functionality, and
- including the determined values for the parameters in respective strings of corresponding tests that test the API response to API requests including the determined values; and storing, with one or more processors, the functional-test specification in memory.

2. The method of claim 1, wherein:

the model of the API is a human-readable, structured-data description of the API in a document encoded in a hierarchical data serialization format;

the model comprises descriptions of a plurality of different sets of functionality including the first set of functionality;

different sets of functionality correspond to different API endpoints;

respective endpoints are accessible by sending an application-layer request via a network to a corresponding uniform-resource locator (URL) that includes an identifier of the corresponding set of functionality associated with the corresponding set of functionality in the model of the API;

identifiers of the sets of functionality in the model of the API include respective paths, or portions thereof, included in the corresponding URLs;

the model of the API specifies how to form a plurality of URLs configured to invoke respective sets of functionality of the API;

the model of the API includes a base-path of the API that is included in a root URL of each of the plurality of URLs;

the model of the API includes a network host identifier that is included in the root URL of each of the plurality of URLs;

the model of the API includes a version-identifier of the API that distinguishes a version of the API described by the model of the API from other versions of the API described by other models;

the model of the API specifies an application-layer protocol by which functionality of the API is invoked;

at least some of the endpoints include a plurality of different functions in the corresponding set of functionality;

the plurality of different functions correspond to different respective application-layer protocol methods;

the same given application-layer protocol method invokes different functions in different sets of functionality depending on which endpoint of the API is associated with the given application-layer protocol method in API requests;

the model of the API describes different functions corresponding to different pairs of application-layer protocol methods and endpoints;

at least some of the endpoints are associated with a plurality of parameters corresponding to key-value pairs of query-strings appended to corresponding URLs;

the key-value pairs include a key corresponding to a parameter identifier of an API key by which API requests are determined to be authorized;

the model of the API indicates that at least some parameters are required for at least some endpoints;

the model of the API indicates that at least some parameters are optional for at least some endpoints;

the model specifies data types of parameters and the data types include an integer data type and a string data type;

the model of the API includes descriptions of sets of responses to API requests corresponding to respective pairs of application-layer protocol methods and endpoints corresponding to API requests; and at least some of the descriptions of sets of responses include an application-layer protocol response code indicative of a correct invocation of functionality.

3. The method of claim 1, wherein:

the functional-test specification is a human-readable, structured-data description of the API in a document encoded in a hierarchical data serialization format;

the functional-test specification includes specifications of at least 10 different functional tests of functionality of a given function in the first set of functionality; and at least some of the specifications of functional tests include respective strings encoding corresponding API requests by which corresponding functionality is invoked for testing.

4. The method of claim 1, wherein generating the functional-test specification for the API comprises:

loading a document encoding the model into program state with the parsing; and for each set of functionality specified in program state, for each function in the respective set, for each parameter of the respective function, performing operations comprising:
- obtaining a first value of the respective parameter of a type, format, and among a set for which the API is designed to respond correctly and generating a positive test case assigning the first value to the respective parameter in text specifying an API request configured to invoke the respective function;
- obtaining a second value of the respective parameter of a type for which the API is not designed to respond correctly and generating a negative test case assigning the second value to the respective parameter in text specifying an API request configured to invoke the respective function;
- obtaining a third value of the respective parameter in a format which the API is not designed to respond correctly and generating a negative test case assigning the third value to the respective parameter in text specifying an API request configured to invoke the respective function; and
- obtaining a fourth value of the respective parameter in a set for which the API is not designed to respond correctly and generating a negative test case assigning the fourth value to the respective parameter in text specifying an API request configured to invoke the respective function.

5. The method of claim 1, wherein:

the first set of tests comprises a positive edge-case functional test and negative edge-case functional test;

the positive edge-case functional test invokes a different branch of program flow of code implementing the API from one or more branches of program flow of positive test cases; and the negative edge-case functional test tests whether the API returns an error for a value of a parameter that is outside of a permitted set.

6. The method of claim 1, wherein:

specifying respective sets of functional tests based on respective sets of parameters comprises specifying a second set of tests of a second set of functionality of the API;

the second set of tests comprises:
- a plurality of positive test cases in which respective values of respective parameters are configured to correctly invoke functionality of the API;
- a plurality of positive edge test cases in which respective values of respective parameters are configured to correctly invoke functionality of the API;
- a plurality of negative test cases in which respective values of respective parameters are configured to incorrectly invoke functionality of the API;
- a plurality of negative edge test cases in which respective values of respective parameters are configured to incorrectly invoke functionality of the API; and
- a plurality of code injection test cases in which respective values of respective parameters are configured to determine whether the respective values cause the API to execute program code included in respective values.

7. The method of claim 1, wherein specifying respective sets of functional tests based on respective sets of parameters comprises at least two of the following:

determining that the model of the API indicates a first parameter is required for a first function and generating a first specification of a first test case, the specification of the first test case comprising:
- text of a first API request in which a value of the first parameter is omitted; and
- a first criterion having a first pattern to be matched to a first response to the first API request to determine whether the first response indicates an error was detected by one or more processes implementing the API;

determining that the model of the API does not indicates a second parameter is permitted for a second function and generating a second specification of a second test case, the specification of the second test case comprising:
- text of a second API request in which a value of the second parameter is included; and
- a second criterion having a second pattern to be matched to a second response to the second API request to determine whether the second response indicates an error was detected by one or more processes implementing the API;

determining that the model of the API indicates a third parameter has an integer data type for a third function and generating a third specification of a third test case, the specification of the third test case comprising:
- text of a third API request in which a value of the third parameter is not an integer data type; and
- a third criterion having a third pattern to be matched to a third response to the third API request to determine whether the third response indicates an error was detected by one or more processes implementing the API;

determining that the model of the API indicates a fourth parameter is to be expressed in a specified date format for a fourth function and generating a fourth specification of a fourth test case, the specification of the fourth test case comprising:
- text of a fourth API request in which a value of the fourth parameter is not expressed in the specified date format; and
- a fourth criterion having a fourth pattern to be matched to a fourth response to the fourth API request to determine whether the fourth response indicates an error was detected by one or more processes implementing the API;

determining that the model of the API indicates a fifth parameter is to be within a specified range for a fifth function and generating a fifth specification of a fifth test case, the specification of the fifth test case comprising:
- text of a fifth API request in which a value of the fifth parameter is not in the specified range; and
- a fifth criterion having a fifth pattern to be matched to a fifth response to the fifth API request to determine whether the fifth response indicates an error was detected by one or more processes implementing the API;

determining that the model of the API indicates a sixth parameter is a parameter of a sixth function and generating a sixth specification of a sixth test case, the specification of the sixth test case comprising:
- text of a sixth API request in which a value of the sixth parameter is executable structured query language code; and
- a sixth criterion having a sixth pattern to be matched to a sixth response to the sixth API request to determine whether the sixth response indicates the structured query language code was executed by one or more processes implementing the API;

determining that the model of the API indicates a seventh parameter is a parameter of a seventh function and generating a seventh specification of a seventh test case, the specification of the seventh test case comprising:
- text of a seventh API request in which a value of the seventh parameter is a command executable by a command line input of an operating system; and
- a seventh criterion having a seventh pattern to be matched to a seventh response to the seventh API request to determine whether the seventh response indicates the command was executed by one or more operating systems in which processes implementing the API execute; or determining that the model of the API indicates an eighth parameter is a parameter of a eighth function and generating an eighth specification of an eighth test case, the specification of the eighth test case comprising:
- text of an eighth API request in which a value of the eighth parameter is configured to cause a buffer overflow; and
- an eighth criterion having an eighth pattern to be matched to an eighth response to the eighth API request to determine whether the eighth response indicates one or more processes implementing the API experienced a buffer overflow.

8. The method of claim 1, wherein specifying respective sets of functional tests based on respective sets of parameters comprises at least six of the following:

determining that the model of the API indicates a first parameter is required for a first function and generating a first specification of a first test case, the specification of the first test case comprising:
  text of a first API request in which a value of the first parameter is omitted; and
  a first criterion having a first pattern to be matched to a first response to the first API request to determine whether the first response indicates an error was detected by one or more processes implementing the API;
determining that the model of the API does not indicates a second parameter is permitted for a second function and generating a second specification of a second test case, the specification of the second test case comprising:
  text of a second API request in which a value of the second parameter is included; and
  a second criterion having a second pattern to be matched to a second response to the second API request to determine whether the second response indicates an error was detected by one or more processes implementing the API;
determining that the model of the API indicates a third parameter has an integer data type for a third function and generating a third specification of a third test case, the specification of the third test case comprising:
  text of a third API request in which a value of the third parameter is not an integer data type; and
  a third criterion having a third pattern to be matched to a third response to the third API request to determine whether the third response indicates an error was detected by one or more processes implementing the API;
determining that the model of the API indicates a fourth parameter is to be expressed in a specified date format for a fourth function and generating a fourth specification of a fourth test case, the specification of the fourth test case comprising:
  text of a fourth API request in which a value of the fourth parameter is not expressed in the specified date format; and
  a fourth criterion having a fourth pattern to be matched to a fourth response to the fourth API request to determine whether the fourth response indicates an error was detected by one or more processes implementing the API;
determining that the model of the API indicates a fifth parameter is to be within a specified range for a fifth function and generating a fifth specification of a fifth test case, the specification of the fifth test case comprising:
  text of a fifth API request in which a value of the fifth parameter is not in the specified range; and
  a fifth criterion having a fifth pattern to be matched to a fifth response to the fifth API request to determine whether the fifth response indicates an error was detected by one or more processes implementing the API;
determining that the model of the API indicates a sixth parameter is a parameter of a sixth function and generating a sixth specification of a sixth test case, the specification of the sixth test case comprising:
  text of a sixth API request in which a value of the sixth parameter is executable structured query language code; and
  a sixth criterion having a sixth pattern to be matched to a sixth response to the sixth API request to determine whether the sixth response indicates the structured query language code was executed by one or more processes implementing the API;
determining that the model of the API indicates a seventh parameter is a parameter of a seventh function and generating a seventh specification of a seventh test case, the specification of the seventh test case comprising:
  text of a seventh API request in which a value of the seventh parameter is a command executable by a command line input of an operating system; and
  a seventh criterion having a seventh pattern to be matched to a seventh response to the seventh API request to determine whether the seventh response indicates the command was executed by one or more operating systems in which processes implementing the API execute; or
determining that the model of the API indicates an eighth parameter is a parameter of a eighth function and generating an eighth specification of an eighth test case, the specification of the eighth test case comprising:
  text of an eighth API request in which a value of the eighth parameter is configured to cause a buffer overflow; and
  an eighth criterion having an eighth pattern to be matched to an eighth response to the eighth API request to determine whether the eighth response indicates one or more processes implementing the API experienced a buffer overflow.

9. The method of claim 1, wherein:
at least some of the criteria specify either application-layer protocol response codes that indicate a passed test or application-layer protocol response codes that specify a failed test.

10. The method of claim 1, wherein:
at least some of the criteria specify either response payload content indicating a passed test or response payload content indicating a failed test.

11. The method of claim 1, comprising:
receiving a request to test the API; and
in response to receiving the request, accessing the functional-test specification in memory and testing the API by:
  sending API requests specified in the functional-test specification;
  receiving API responses to the API requests; and
  determining whether the API responses indicate corresponding tests are passed by comparing the API responses to corresponding criteria of the functional-test specification by which API responses to respective tests are determined to pass or fail respective tests.

12. The method of claim 11, comprising:
before testing the API, causing a user interface to be presented on a user computing device by which the functional-test specification is edited; and
changing the functional-test specification responsive to inputs to the user interface from a user.

13. The method of claim 1, wherein:
the functional-test specification specifies more than 1000 different specifications of different functional tests generated programmatically based on the model of the API.

14. The method of claim 1, wherein:
generating the functional-test specification comprises steps for generating a functional-test specification.

15. The method of claim 1, wherein:
the request to generate a functional-test specification for the API is automatically generated as part of a build process of code configured to invoke the API or as part of a build process of code configured to implement the API.

16. The method of claim 1, comprising:
testing functionality of the API with the functional-test specification;
load testing the API; and
providing one or more reports on functional testing results and load testing results.

17. A tangible, non-transitory, machine-readable medium storing instructions that when executed by one or more processors effectuate operations comprising:
obtaining, with one or more processors, a model of an application program interface ("API"), wherein:
the model of the API describes how to interact with the API,
the model of the API comprises a first identifier of a first set of functionality exposed by the API,
the model of the API associates with the first identifier a first set of a plurality parameters of at least some functions of the first set of functionality by which at least some functionality of the first set of functionality is invoked in API requests, at least in part, by specifying values of respective parameters in API requests, and
the model of the API is distinct from source code of one or more processes implementing functionality of the API;
receiving, with one or more processors, a request to generate a functional-test specification for the API, the functional-test specification specifying a plurality of tests of functionality of the API with test cases specified by the functional-test specification;
detecting, with one or more processors, sets of functionality identified by the model of the API and respective sets of parameters corresponding to the detected sets of functionality by parsing the model of the API;
in response to receiving the request, generating, with one or more processors, the functional-test specification for the API by, for at least some respective detected sets of functionality, specifying respective sets of functional tests based on corresponding sets of parameters, wherein:
specifying respective sets of tests comprises specifying a first set of tests of the first set of functionality,
the first set of tests comprises respective positive test cases that test different respective subsets of parameters among the first set of the plurality of parameters,
the positive test cases have values of respective parameters in different respective subsets of parameters that correctly invoke functionality of the API in the first set of functionality,
the first set of tests comprises respective negative test cases that test different respective subsets of parameters among the first set of the plurality of parameters,
the negative test cases have values of respective parameters in different respective subsets of parameters that incorrectly invoke functionality of the API in the first set of functionality,
specifications of tests among the first set of tests comprise respective criteria by which API responses to respective tests are determined to pass or fail respective tests, and
generating the functional-test specification comprises forming the respective strings encoding corresponding API requests by:
parsing portions of the strings from the model of the API,
arranging the portions of the strings in an order indicated by the model of the API,
determining values for parameters by systematically varying the values to test different attributes of functionality, and
including the determined values for the parameters in respective strings of corresponding tests that test the API response to API requests including the determined values; and
storing, with one or more processors, the functional-test specification in memory.

18. The medium of claim 17, wherein generating the functional-test specification for the API comprises:
loading a document encoding the model into program state with the parsing; and
for each set of functionality specified in program state, for each function in the respective set, for each parameter of the respective function, performing operations comprising:
obtaining a first value of the respective parameter of a type, format, and among a set for which the API is designed to respond correctly and generating a positive test case assigning the first value to the respective parameter in text specifying an API request configured to invoke the respective function;
obtaining a second value of the respective parameter of a type for which the API is not designed to respond correctly and generating a negative test case assigning the second value to the respective parameter in text specifying an API request configured to invoke the respective function;
obtaining a third value of the respective parameter in a format which the API is not designed to respond correctly and generating a negative test case assigning the third value to the respective parameter in text specifying an API request configured to invoke the respective function; and
obtaining a fourth value of the respective parameter in a set for which the API is not designed to respond correctly and generating a negative test case assigning the fourth value to the respective parameter in text specifying an API request configured to invoke the respective function.

19. The medium of claim 17, wherein:
the first set of tests comprises a positive edge-case functional test and negative edge-case functional test;
the positive edge-case functional test invokes a different branch of program flow of code implementing the API from one or more branches of program flow of positive test cases; and
the negative edge-case functional test tests whether the API returns an error for a value of a parameter that is outside of a permitted set.

20. The medium of claim 17, wherein:
specifying respective sets of functional tests based on respective sets of parameters comprises specifying a second set of tests of a second set of functionality of the API;

the second set of tests comprises:
- a plurality of positive test cases in which respective values of respective parameters are configured to correctly invoke functionality of the API;
- a plurality of positive edge test cases in which respective values of respective parameters are configured to correctly invoke functionality of the API;
- a plurality of negative test cases in which respective values of respective parameters are configured to incorrectly invoke functionality of the API;
- a plurality of negative edge test cases in which respective values of respective parameters are configured to incorrectly invoke functionality of the API; and
- a plurality of code injection test cases in which respective values of respective parameters are configured to determine whether the respective values cause the API to execute program code included in respective values.

\* \* \* \* \*